3,448,355
United States Patent Office
Patented June 3, 1969

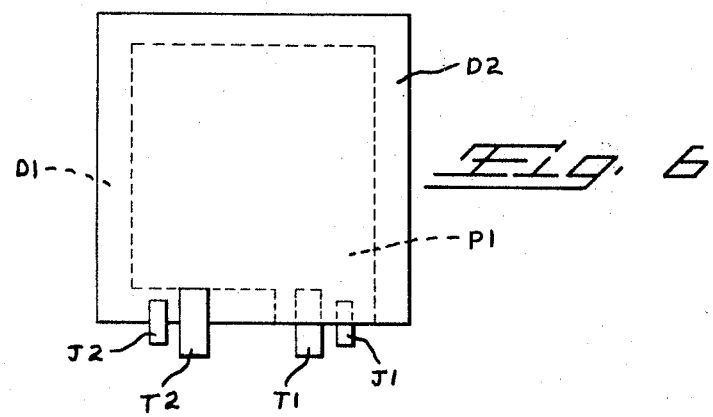
Fig. 6
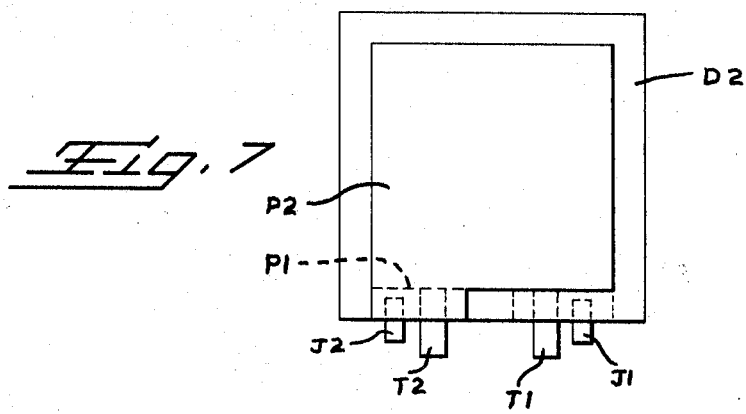
Fig. 7
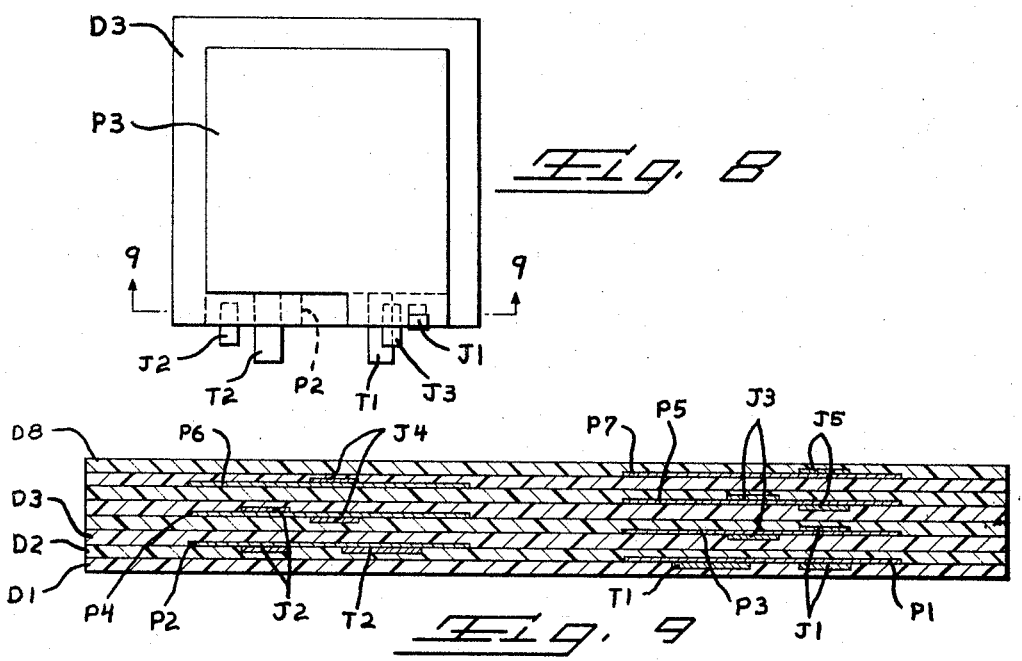
Fig. 8
Fig. 9

1

3,448,355
LAMINATED ELECTRICAL CAPACITOR AND METHODS FOR MAKING
John James Ahearn, Jr., Lancaster, and Thomas Robert Clements, Elizabethtown, Pa., assignors to AMP Incorporated, Harrisburg, Pa.
Filed Mar. 1, 1967, Ser. No. 619,822
Int. Cl. H01g 1/02
U.S. Cl. 317—261                                   9 Claims

ABSTRACT OF THE DISCLOSURE

An electrical capacitor having foil-like plates is disclosed incorporating the interconnection scheme with dielectric layers bonded by a thermoplastic resin.

Relatively substantial flat areas of contact interface between conductive members are held by a bonding of insulating sheets as under heat and pressure to avoid the use of extraneous material such as solder or the need for crimping, or crimping structures. The electrical connection means is used making various connections in a laminated electrical capacitor.

Background of the invention

The termination of thin metallic members such as the plates typically used in capacitors has long been a problem. A variety of approaches have been used including soldering, welding, clinching and crimping. The characteristics of thin metallic members such as metal foil, deposited or sputtered films make these techniques both difficult and time consuming to carry out in practice.

An example of this is presented by reviewing the procedure necessary to interconnect a capacitor structure having laminations to dielectric material bonded by thermoplastic resin and aluminum foil electrodes. The difficulty of welding aluminum in any form is well known. The difficulty when aluminum is in a foil configuration is accentuated because of the possibility of fracture caused by embrittlement of the foil surrounding the weld site which is overly heated during the welding operation. The usual problem of burn-through with aluminum is of course more critical when the material is in a thin foil configuration. Next, there is the problem of damage to dielectric material and/or thermoplastic bonding resin which may be occasioned by welding techniques. This causes delamination which results in failure of the unit. The use of tabs of sufficient length to eliminate dielectric or resin damage itself causes a problem, especially when the capacitor is potted in material which may crack and break the connection of the foil during setting. Soldering of aluminum foil is not much better in that the heat problem, although somewhat reduced, is still present and the art of soldering aluminum is not sufficiently developed to be used on a production basis. Clinching and crimping eliminate the heat problem but require a foil thickness which is greater than is desirable for many capacitor designs.

As previously mentioned the use of tabs made to extend out from the laminations of foil and dielectric material in a capacitor is generally undesirable because it increases the overall size of the package and it increases the likelihood of shorts due to exposed metallic members as well as breakage due to the necessity of bending the thin foil tabs during packaging.

Summary of the invention

This invention relates to a method and means for providing an electrical interconnection between thin conductive members such as the foil-like plates of a capacitor.

2

One object of the invention is to provide a termination and interconnection of thin metallic members which is stable and reliable with minimum heating and mechanical stress of such members. A further object is to provide a termination and interconnection technique for thin foil members without the introduction of materials into the interface between thin members as is required in welding or soldering. Another object is to provide an interconnection of thin metallic members providing a low resistance, stable interface for use in electrical and electronic circuits without the introduction of conductive material other than the material being interconneced.

Yet another object of the invention is to provide an interconnection of capacitor plates which includes only the conductive material which forms the plates and one other conductive material to interconnect the plates of the capacitor. Still another object is to provide a capacitor having foil plate members interconnected by foil jumpers in a manner reducing the overall size of the capacitor package. And finally, it is a special object of the invention to provide a capacitor package consisting solely of dielectric material, a thermoplastic bonding resin, aluminum foil plates and nickel jumper strips.

In the drawings:

FIGURES 2–8 show in plan and on a step-by-step basis the assembly and method of the invention in a capacitor embodiment; and FIGURE 9 is a section of the capacitor taken along lines 9—9 of FIGURE 8.

Figure 1:
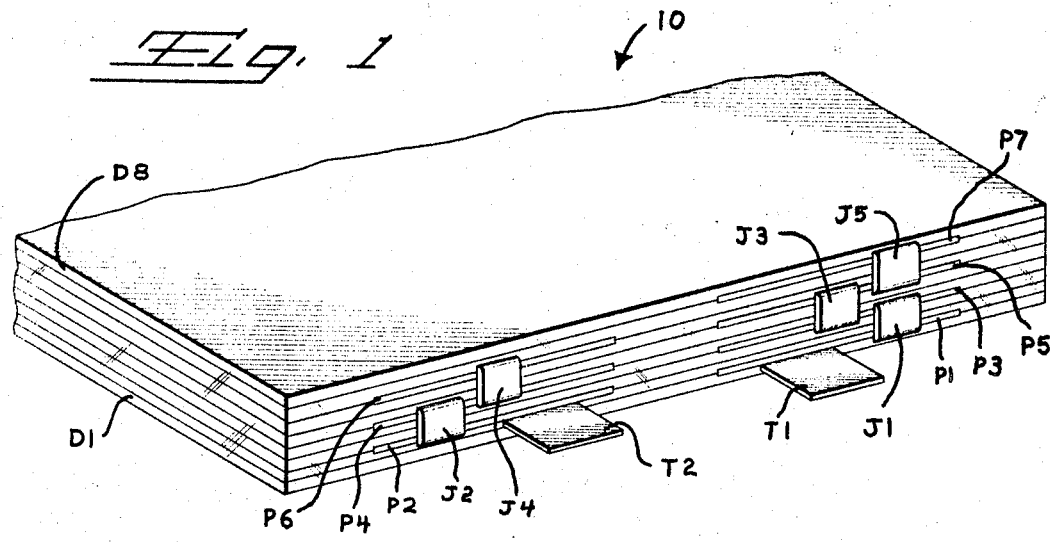
FIGURE 1 is a perspective showing an interconnection of conductive members in accordance with the invention as viewed from a portion of a capacitor made up of a lamination of conductive electrodes and dielectric sheets.

In the drawings and in particular in FIGURES 1, 8 and 9, the relative thickness of the dielectric plastic sheets and of the metallic members is somewhat exaggerated for the purpose of clarity. It is to be understood that the thickness of these members may be expected in practice to be considerably thinner than that shown.

Description of a preferred embodiment

Referring to FIGURE 1 the element 10 is the end of a capacitor which may be used in the manner shown or, if desired, may be potted in some protective insulating material such as RTV, Silastic. The eight sheets of dielectrical plastic material D1–D8 are merely representative and it is to be understood that more or less sheets of material may be employed in practice. Between each pair of sheets D1–D8 is provided a thin conductive member P having a plan configuration as indicated in FIGURES 4–8 with one edge portion extending to the edge of the sheets D1–D8 as indicated in FIGURE 1. The members P are dimensioned so that the sheets D extend out beyond the other edges of P to surround the sheets. The thin conductive members, denominated P1–P7, serve as electrodes in the capacitor embodiment representing the invention. The members P1, P3, P5 and P7 form one plate and the members P2, P4 and P6 form the other plate of the capacitor.

Input terminals to 10 are provided through thin conductive members T1 and T2 interconnected respectively to the alternate conductive members between the sheets D1–D8. The members P1, P3, P5 and P7 are connected to T1 and to each other through jumpers J1, J3 and J5. The alternate set of members P2, P4 and P6 are connected to each other and to T2 through jumpers J2 and J4. In accordance with the invention the jumpers are folded in against the edge of the lamination of sheets D1–D8 and are positioned at opposite ends of the one edge of the capacitor 10. The advantage of this to packaging and to resisting breakdown between plates should be apparent from FIGURE 1. It is to be noted that both terminals are at one side of the package and are the only members which protrude therefrom. It is also to be noted that there is a relatively large flat area of interface between the various conductive members and sheets, and that a substantial portion of the surface area of each jumper is utilized. The terminals T1 and T2 are made of sufficient size to facilitate an interconnection of the capacitor 10 into a circuit by any one of a number of standard techniques.

In an actual embodiment wherein the terminals T1 and T2 were comprised of a nickel foil, interconnection was provided by welding an 18 AWG nickel to the outer ends of the terminals. No delamination was observed after welding.

As will be made apparent hereinafter this is the only point at which a standard interconnection is utilized and there is no standard interconnection within or between the various other metallic parts of the capacitor.

Referring now to FIGURES 2–8, a description will be given of the method of assembly of the invention which should more clearly reveal the structure contemplated by the invention. In the description to be hereinafter given, the sheets D1–D8 will be referred to as dielectric material in that the specific embodiment shown is a capacitor package. It is to be understood that it is contemplated that the various sheets may be of a material which is only insulating in terms of function or a plastic material having insulating qualities which is readily deformable by heat and pressure. A wide variety of thermoplastic materials are available which have these characteristics. It is fully contemplated that the method and structure of the invention may be utilized for interconnecting electrical or electronic components or conductive pairs other than as related to a capacitor structure. One example would be for integrated circuit packages which include a member of foil-like conductors leading to and from the electrical components of the circuit as contained on a chip or insulating substrate.

Figure 2:
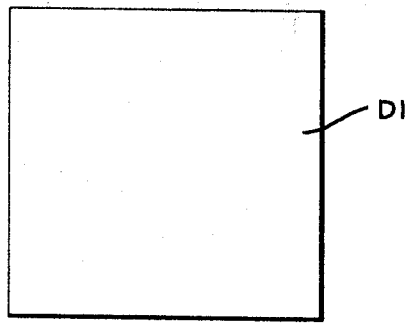
Figure 3:
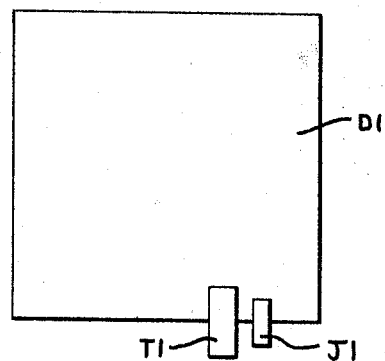

In FIGURE 2 a sheet D1 is laid down on a suitable flat surface and a terminal T1 and jumper J1 are placed thereon in a spaced apart position, as shown in FIGURE 3. In an actual embodiment the sheets D1–D8 were of a dielectric material formed of hectorite clay from the method taught in U.S. Patent No. 3,012,050 to H. A. Fox, Jr., et al. granted Dec. 5, 1961. The hectorite sheets were coated with a polyvinyl carbazole resin adhesive in accordance with U.S. Patent No. 2,967,986 to J. C. Balsbaugh granted Jan. 10, 1961. The sheets D2–D7 were approximately 2.5 by 3.0 inches in width and breadth, each of two sheets 0.0008 of an inch in thickness coated on each side. The sheets D1 and D8 were comprised of two such sheets plus an additional sheet coated on one side. The polyvinyl carbazole finished coating (after compression) was approximately 0.0004 of an inch in thickness. The terminal T1 was approximately 0.25 by 2.0 inches in width and length and approximately 0.0001 inch in thickness. The jumper J1 was approximately 0.12 by 0.75 of an inch in width and length and approximately 0.001 of an inch in thickness. The terminal and jumper were comprised of nickel foil.

Figure 4:
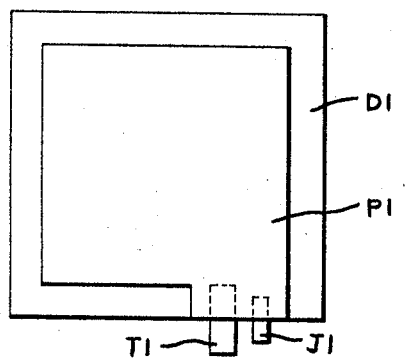
Figure 5:
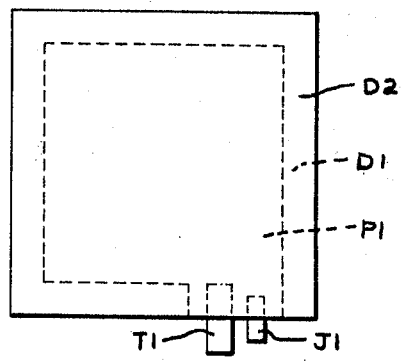

Following positioning in the manner indicated in FIGURE 3, the terminal T1 and jumper J1 are tacked to the sheet D1 by touching a soldering iron to the foils at a point thereon overlying the sheet to spot bond the members thereto for positioning during assembly. Next, a plate member P1 is placed in position as shown in FIGURE 4 with a portion thereof overlying T1 and J1. In an actual embodiment P1 was an aluminum foil approximately 2 by 2½ inches in width and breadth and approximately 0.0005 of an inch in thickness. As can be seen in FIGURE 4 a portion of P1 is made to extend from the main body of the member to approximately the edge of D1 to fully cover over T1 and J1, leaving the main body of P1 free of T1 and J1. The member P1 is then tacked to D1 as by the application of heat from a soldering iron at several points overlying D1. FIGURE 5 shows the next step which includes the application of a second sheet of dielectric material D2. Following that, as indicated in FIGURE 6, the terminal T2 and the jumper J2 are laid down on an edge opposite T1 and J1 but in the same relative position. Again, these members are tacked to the sheet of dielectric material. A second plate member P2 is then positioned on D2 with the projecting portion overlying T2 and J2 as shown in FIGURE 7. The member P2 is tacked to D2 as previously mentioned and a further dielectric sheet D3 is laid over P2.

FIGURE 8 shows the assembly of FIGURE 7 with the addition of the third sheet D3, a third plate member P3, a third jumper J3 and with the jumper J1 folded over to contact the plate P3. The jumper J3 is offset from J1 to reduce a thickness build-up which would otherwise result in the lamination to make the final pressing of the package difficult to achieve with a satisfactory exclusion of air or voids.

The remaining elements of the assembly 10 are added in the foregoing manner with the jumpers being tucked into succeeding laminations as shown in FIGURE 1. In accordance with the invention as indicated in FIGURE 9, the jumpers go from the bottom of one plate member to the top of another plate member. When a stack of sheets and plates is complete it is compressed under a relatively even pressure to avoid fracture of the conductive members, and preferably with heat to cause the adhesive on the sheet members to flow and effectively bond the various members together. In an actual embodiment a completed stack was subjected to 500 p.s.i. at 250–260° C. for approximately two hours. This stack had 46 layers of insulation and withstood five cycles of test without failure with each cycle including three hours at −55° C., thirty minutes at room temperature and three hours at +125° C.

In the package described it is to be noted that each interface is from aluminum to nickel or from nickel to aluminum with no interface between the same metal. This is believed to provide a distinctly improved stability and low resistance to the junction of metallic members. It is contemplated that various other combinations of different metal members may be employed. For example, nickel plates with aluminum jumpers may be used. It is also contemplated that a proper interface of different metals can be provided by plating a base sheet with the plated surface being then placed against an unplated surafce of a further sheet of the metal of the base sheet. For example, a nickel or gold plated aluminum jumper could be used with an aluminum plate.

It is additionally contemplated that the invention may be used with the jumpers or terminals on different sides of the package.

Now having described the invention in an embodiment intended to enable its practice in a preferred mode we define it through the appended claims.

We claim:

1. In a method for interconnecting electrical components the steps comprising providing at least two thin flat conductive members each connected to a component to be electrically interconnected in a circuit providing at least a further thin flat conductive member, providing a plurality of relatively thin sheets of insulating plastic having a surface of thermoplastic material, positioning said members and sheets with substantial portions of the surface area of the further member in contact with surface areas of said two members and with said sheets on each side and between said two members having edge portions overlapping said conductive members, compressing said sheets, and members evenly over the surface area thereof and applying heat to cause said thermoplastic material to flow into broad surface contact with said members and to force said first material and further members into a broad area of contact to effect a permanent electrical and mechanical connection therebetween held by said plastic.

2. In a method for interconnecting electrical components the steps comprising providing at least two thin flat conductive members each connected to a component to be electrically interconnected in a circuit, providing at least a further thin flat conductive member, providing a plurality of relatively thin sheets of insulating plastic having a thermoplastic adhesive on the surface thereof, positioning said members with substantial portions of the surface area of the further member in contact with surface areas of said two members and with said sheets on each side and between said two members, compressing said sheets and members evenly over the surface area thereof to effect a broad surface bonding of said adhesive between said sheets and said members with said two and further members being forced into a broad area of contact to effect a permanent electrical and mechanical connection therebetween held by said plastic.

3. In a method of interconnecting electrical components the steps comprising providing a plurality of sheets of insulating material having a thermoplastic adhesive covering the surface thereof, a plurality of thin flat conductive members each connected to a component to be interconnected, and at least one jumper of thin flat conductive material, stacking said sheets and members with a sheet on each side of a member and therebetween and with a jumper having one portion inserted between one sheet and one member and folded with another portion inserted between another sheet and another member and then compressing said stack evenly over the surface thereof to effect a bonding of said adhesive to permanently secure said jumper portions in broad area contact with said members permanently held by said sheets.

4. The method of claim 3 wherein said jumpers are folded with one end portion in engagement with one side of one member and the other end portion in engagement with an opposite side of another member, relative to the orientation of said members in said stack.

5. The method of claim 3 wherein at least two jumpers are provided to interconnect at least four members separated by sheets and including the step of positioning said jumpers on said sheets in a non-overlapping relationship to minimize stack thickness and voids within said stack following compression.

6. In a device providing an electrical interconnection of electrical components, the combination comprising a laminar stack including a plurality of sheets of relatively thin insulating material having a thermoplastic surface and having disposed therebetween relatively thin flat conductive elements each connected to an electrical component, a tab member of relatively thin flat conductive material having a portion extending into said stack and in engagement with at least one of said elements and a series of jumpers of relatively thin flat conductive material each having the end portions thereof in broad surface area contact with one of said elements to connect a pair of elements and with pairs of elements also connected by said jumpers the said stack having been compressed to effect a bonding of the said sheets to hold said tab and said jumpers in broad area of contact with said elements.

7. The article of claim 6 wherein said sheets are of dielectric material and said components are plates of a capacitor.

8. The article of claim 6 wherein said sheets are of dielectric material and said components are plates of a capacitor and are aluminum foil and said jumpers and said tabs are of nickel foil.

9. A capacitor comprised of sheets of dielectric material having therebetween a thermoplastic adhesive coating, a series of first and second capacitor plates disposed between alternate sheets of dielectric material with at least a sheet of dielectric material separating a given first and a given second plate and with the said plate being formed by aluminum foil, a series of jumpers connecting all of the plates of said first group of plates and a series of jumpers connecting all of the plates of said second group of plates, at least a pair of terminals individually connected to the said first and second groups of plates, the said jumpers and terminals being comprised of nickel foil and the said jumpers, terminals and plates being positioned so that there is an interface only between nickel and aluminum in said capacitor, the said sheets having been compressed and heated to a degree to effect a bonding of said adhesive to hold said plates, jumpers and terminals in broad area of contact.

References Cited

UNITED STATES PATENTS

| 2,627,645 | 2/1953 | Harris | 29—25.42 |
| 2,764,718 | 9/1956 | Peck | 317—261 X |
| 3,134,059 | 4/1964 | Rayburn | 317—260 |
| 3,153,180 | 10/1964 | Bellmore | 317—260 |
| 3,229,173 | 1/1966 | McHugh | 317—261 X |

LEWIS H. MYERS, *Primary Examiner.*

E. A. GOLDBERG, *Assistant Examiner.*

U.S. Cl. X.R.

29—25.42; 156—313; 174—72